(12) United States Patent
Noeske et al.

(10) Patent No.: US 7,769,989 B2
(45) Date of Patent: Aug. 3, 2010

(54) PROCESSOR FOR PROCESSING DATA USING ACCESS ADDRESSES LINKED TO THE DATA TYPE OF THE PROCESSED DATA

(75) Inventors: Carsten Noeske, Sexau (DE); Matthias Vierthaler, Denzlingen (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 0 days.

(21) Appl. No.: 11/515,353

(22) Filed: Sep. 1, 2006

(65) Prior Publication Data

US 2007/0118727 A1   May 24, 2007

(30) Foreign Application Priority Data

Sep. 1, 2005   (DE)  .................. 10 2005 041 672

(51) Int. Cl.
G06F 9/00   (2006.01)
(52) U.S. Cl. .............................. 712/220; 712/22
(58) Field of Classification Search ............... 712/22, 712/220, 225; 711/100
See application file for complete search history.

(56) References Cited

U.S. PATENT DOCUMENTS 5,812,147 A * 9/1998 Van Hook et al. .......... 345/537
6,170,001 B1   1/2001 Hinds et al. ............... 7/38
6,195,746 B1   2/2001 Nair
2006/0080477 A1 * 4/2006 Seigneret et al. .......... 710/22

FOREIGN PATENT DOCUMENTS

WO   WO 00/08553   2/2000   ............ 9/318

OTHER PUBLICATIONS

Liles, AG, "Tagged Vector Data Registers," IBM Technical Disclosure Bulletin, vol. 22, No. 7, pp. 3011-3012, Dec. 1979.
Gehringer et al., "Tagged Architecture: How Compelling Are its Advantages?" 12$^{th}$ International Symposium on Computer Architecture, Jun. 1985, pp. 162-170.
European Search Report.

* cited by examiner

*Primary Examiner*—David J Huisman
(74) *Attorney, Agent, or Firm*—O'Shea Getz P.C.

(57) ABSTRACT

A processor architecture, for example, a SIMD processor architecture, includes at least two arithmetic/logic units to implement data processing, a data memory arrangement or a memory device interface to a memory arrangement to store data of different data types, an addressing unit to generate access addresses for the data to be stored in the data memory arrangement, and an address memory arrangement to store access addresses. The access addresses are logically linked to the given data type of the data, and/or a distribution of the data to the arithmetic/logic units is dependent on the access addresses, and/or a storage of the output data as the data is dependent on the access addresses.

15 Claims, 2 Drawing Sheets

| LSB of a0–an | sf | L-MUX | R-MUX | LS-MUX | RS-MUX | Write Mask |
|---|---|---|---|---|---|---|
| 0 (Even) | 0 (Mono) | 0 (Left) | 0 (Left) | 0 (ALU-L) | x (-) | 0xffffff000000 |
| 1 (Odd) | 0 (Mono) | 1 (Right) | 1 (Right) | x (-) | 0 (ALUL-L) | 0x000000ffffff |
| 0 (Even) | 1 (Stereo) | 0 (Left) | 1 (Left) | 0 (ALU-L) | 1 (ALU-R) | 0xffffffffffff |
| 1 (Odd) | 1 (Stereo) | 1 (Right) | 0 (Right) | 1 (ALU-R) | 0 (ALU-L) | 0xffffffffffff |

FIG. 2

PROCESSOR FOR PROCESSING DATA USING ACCESS ADDRESSES LINKED TO THE DATA TYPE OF THE PROCESSED DATA

PRIORITY INFORMATION

This patent application claims priority from German patent application 10 2005 041 672.1 filed Sep. 1, 2005, which is hereby incorporated by reference.

BACKGROUND OF THE INVENTION

The invention relates in general to a processor architecture and in particular to processing data of different data types in a processor.

In microprocessors there often exists the requirement to load, process, and store data of different data types. For many of these data types, there are conversion rules that enable one data type to be converted to another. It is often the case that the conversion in one direction does not entail any loss of information or accuracy, whereas conversion in the opposite direction is not possible without such loss. Examples include bit widths for integers, for example, 8 bit, 16 bit, 32 bit, and 64 bit.

When data is loaded into an arithmetic logic unit or register, a conversion occurs in many existing architectures to a data type into which generally all data types can be converted without loss of information or accuracy. For example, this may be a 64-bit number. While processing may be carried out on this general data type, there typically is a reconversion to a different data type for storage to ensure efficient utilization of the storage device.

When loading and storing of data are carried out, an access address is used to select directly or indirectly a memory cell through a memory device interface in which the desired data value is located or in which the data value is to be stored. Often, however, the bit width of the memory cell does not match that of the smallest data type but rather that of the largest data type to be able to load the latter as quickly as possible. For this reason, least significant bits (LSBs) are attached to the access addresses, these bits representing the subranges of the memory cells. During loading and storing, generally an additional logic is used for the extraction or reading of data or the writing of data to the correct position within the memory cell. Also, during writing the other, non-written bits within a memory cell are not overwritten. Generally, this is achieved using a write mask in which the bits to be changed within the memory cell are set to logical "1". Alternatively, a plurality of memories having the size of the smallest data type can also be used to which the same access address and corresponding part of the datum is applied, and only the required memories are activated by a write-enable signal.

In the prior art, the information as to which data type is being loaded/stored is contained or encoded in the instruction word that controls the loading operation. The instruction words are that part of the machine language of a processor which indicates what type of instruction is involved, for example, addition, subtraction, or jump.

A disadvantage of this method is that the encoding of the data type in the instruction word enlarges the required program memory. Alternatively, given a fixed bit width for the instruction words the method assigns bits that otherwise could be utilized for encoding other control information.

Another disadvantage of this method is that the algorithm which describes the data processing must be stored explicitly for each data type. This also enlarges the required program memory. In addition, the required assembler syntax becomes less intuitive such that operations which implement identical content are described differently in terms of the given data type.

In SIMD (Single Instruction/Multiple Data) processors, during signal processing, identical operations are often implemented by different parallel arithmetic logic units using different data. For example, in an image processing operation an IDCT (Inverse Discrete Cosine Transform) transform is implemented for blocks of an image during MPEG (Moving Picture Experts Group) video encoding. To accelerate these operations on one processor, SIMD operations are defined such that their decoding results in identical operations within multiple arithmetic/logic units (ALUs). In audio processing, increasing use is being made of Dual-MAC (Multiply/Accumulate) units to process audio data. This approach exploits the fact that standard algorithms for a left channel and right channel of audio data are normally identical, while only the individual input data differ.

A SIMD processor is generally known having an architecture with at least two arithmetic/logic units to implement data processing, a data memory arrangement or a memory device interface to a memory arrangement to store data of different data types, an addressing unit to generate access addresses for the data to be stored in the data memory arrangement, and an address memory arrangement to store access or base addresses. In this type of processor architecture, the data of different data types are stored in the data memory arrangement independently of the given data type. An access address for a given memory area is assigned to the data for storage. To process the data, the data are retrieved from the data memory arrangement and applied to one of the arithmetic/logic units. Intermediate storage of the data in a register can occur.

The number of parallel units utilized, or the utilized bit width of the operands in these processors, is encoded in the instruction words. For example, in processors intended for image processing the selected processing can be between 4×8 bit×8 bit, 2×16 bit×16 bit, or 1×32 bit×32 bit. In audio signal processing, it is often possible to trigger dual MAC instructions. However, this is generally explicit from the instruction word. As a result, even in this case the above-described disadvantages still result by encoding the data type in the instruction.

As evident from above, a data type means not only information as to whether what is involved is, for example, integer data or floating-point data as a specific mathematical data type, but additionally or alternatively also information as to whether, in the case, for example, of audio data, what is involved is stereo data or mono data. The term "data type" is therefore understood not only in the purely mathematical sense but it also comprises an assignment of given data to certain specific applications of the data. The term "data type" also refers to an assignment of different bit widths.

What is needed is a simplification, in a SIMD processor architecture or in a method of processing data of different data types, of the handling of data of different data types and their distribution to or from arithmetic units within a SIMD processor architecture. In particular, what is needed is a simplification of the instruction words and the achievement of formulating an algorithm in machine language independently of data type.

SUMMARY OF THE INVENTION

Briefly, in accordance with an aspect of the present invention, a processor architecture, in particular, a SIMD processor architecture, includes at least two arithmetic/logic units to implement data processing, a data memory arrangement or a memory device interface to a memory arrangement to store data of different data types, an addressing unit to generate access addresses for the data to be stored in the data memory arrangement, and an address memory arrangement to store access addresses. The access addresses are logically linked to the given data type of the data and/or a distribution of the data to the arithmetic/logic units is dependent on the access addresses, and/or a storage of the output data as the data is dependent on the access addresses.

The processor architecture may have the access addresses assigned to the data in the addressing unit and/or in the data memory arrangement in a manner dependent on the given data type of the data.

The processor architecture may have the access addresses comprise actual memory address values, comprise base addresses from which actual memory address values are determinable, and/or comprise add-on information items logically linked to these addresses.

The term "access address" is understood to mean in general addresses in the broadest sense which are usable to address the data to be stored or stored in the data memory arrangement. Thus, in addition to direct actual address values which point to a specific memory location, the term "access address" also includes base addresses which are an additional offset that leads to the actual address or actual addresses.

The processor architecture may have copying logic to copy the data applied from the data memory arrangement to an input of the other one of the arithmetic/logic-units in a pair of ALUs. The processor architecture may have an instruction set independent of the data type for processing data in one ALU that is appropriate for a specific data type. The processor architecture may define the data type by means of instructions before a data processing routine is started.

The processor architecture may be such that a first one of the ALUs processes a first data type, and a second one of the ALUs processes a second data type. A control device may assign data of a specific data type to be processed to one of the ALUs for the given data type in a manner dependent on the access address, dependent on a component of the access address, or dependent on an add-on to the access address. A component of the access address may also be an information item supplied within the peripheral field, for example, of a base address to generate an actual address value used to access the data. This information item can be stored, for example, in the pointer register which stores the base address from which the actual address value is calculated by an offset. In this case, the base address is of subordinate significance since for the access address it is the information item additionally assigned to the base address that is of significance as a component thereof. The boundaries between a component of the access address and an add-on are viewed, for example, as floating.

The access addresses are formed from a uniform memory address, from an information item contained in the pointer register, and/or from an additional data-type information.

Data of different data types are stored in a data memory arrangement, wherein an access address for a memory area of the data memory arrangement is assigned to the data, and in order to process the data, the data are retrieved from the data memory arrangement and applied to at least one ALU. The assignment of the access address to the data to be stored is implemented in a manner dependent on the given data type of the data, and/or the access addresses are linked to the given data type of the data, and/or a distribution of the data to the ALUs is implemented in a manner dependent on the access addresses, and/or a storage of the output data as the data is implemented in a manner dependent on the access addresses.

The data applied from the data memory arrangement to an input of one of the ALUs is copied to an input of the other one of the ALUs in a pair of ALUs. An instruction code to process the data is encoded in one of the ALUs independently of the data type of the data.

The data are applied to a specific one of the ALUs in a manner dependent on the access address, dependent on a component of the access address, or dependent on an add-on to the access address, where the specific one of the ALUs is used to process the given data type of the data.

The access addresses are formed from an actual memory address and/or from additional data type information item as an extended access address. The method may have no assignment instruction components contained in the instruction code to assign the data to specific arithmetic/logic units.

An information item relating to the specific data type of data to be processed is stored not in an instruction word for later processing of the data but in the peripheral field of the datum or of the access address for the data memory arrangement in which the data of different data types are stored. Storing the data type information item in connection with the access address is relatively efficient with respect to arrays of the same data type. Accordingly, the information item regarding the data type is stored in the addressing unit when starting the pointer register. When loading one datum or multiple data with the corresponding, and possibly yet-to-be-processed, pointer as a base form of an access address, or, for example, as a component of the access address in the form of a base address to form a particular access address for an actual address value, the associated hardware recognizes which data type the datum or data to be stored are, and extracts the elements or data accordingly and assigns them to the appropriate ALUs. Recognition is carried out based on an access address before computing a specific address value within the data memory arrangement. ALUs can be employed which operate with a fixed word width.

An automatic conversion of the data from one type to another can occur directly during loading of the data or during execution of the given instructions, although the given encoded instruction for different data types may be the same. Accordingly, the step of programming a plurality of essentially identical instructions or instruction sequences for different data types is unnecessary since assignment of the stored data to specific ALUs is implemented in a manner dependent on the access address in the memory arrangement.

Another advantage is in the relatively efficient utilization of the memory by addressing the smallest unit even though the memory-bit width corresponds to that of a multiple data word. In the case of access to fewer values than possible, the loaded values are copied by a control logic to the inputs of the units not required for processing, with the result that consistency of data is achieved.

Based on the preferred processor architecture, it is possible to encode the algorithm, or a corresponding instruction code, independently of how many channels are processed, in instruction words, and thus work all or part of the channels simultaneously. It is possible to access intermediate results of the parallel-operating channels.

These and other objects, features and advantages of the present invention will become more apparent in light of the

BRIEF DESCRIPTION OF THE DRAWINGS

FIG. 2 is a table with assignment possibilities for specific data to various components and processing steps within the SIMD processor architecture of FIG. 1.

DETAILED DESCRIPTION OF THE INVENTION

Figure 1:
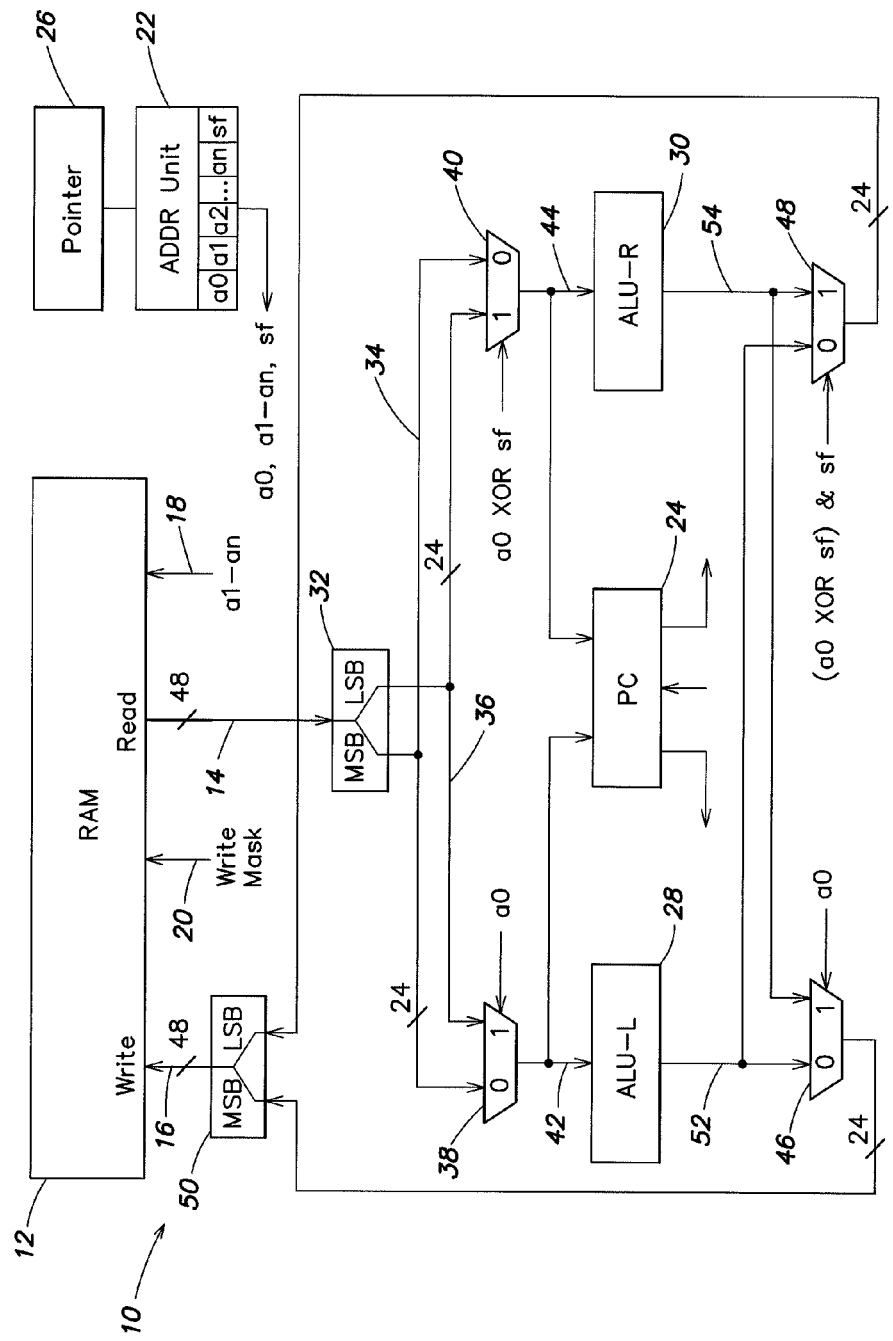
FIG. 1 is a block diagram illustration of an arrangement of individual components of a SIMD processor architecture for storing and processing data of different data types.

FIG. 1 illustrates certain individual components of a SIMD or SIMD-capable processor architecture 10.

A direct access RAM memory 12 may be integrated in the processor architecture 10 or may be connected through an appropriate memory device interface. The data memory arrangement RAM 12 stores data to be processed in the processor architecture 10. However, the RAM 12 can optionally store additional data, program code, etc. The data are typically applied to the RAM 12 and stored therein using read and write data buses 14, 16, an address bus 18, and a write mask 20. For purposes of storing the data in the RAM 12, a higher-level memory arrangement can also be created having a special data memory arrangement in the form of a sub-area therein. The write mask 20 serves as a safety measure, for example, to write mono data without overwriting an adjacent value in the process. In the alternative, two direct access memories, for example, can also be employed, for example, one for even addresses and one for odd addresses, in which case a write-enable signal for each direct access memory is used to achieve appropriate control.

The data are stored in the RAM 12 at specific assigned memory addresses within the RAM 12. Assignment of the data to specific memory addresses within the RAM 12 is carried out by an addressing unit 22 which can be a separate component or part of a processor core 24. The addressing unit 22 assigns in each case to the data a pointer, optionally with an offset, as an access address a0, a1-an, sf by which the data are stored in the data memory arrangement RAM 12 at a particular assigned memory address. The access addresses a0, a1-an, and the add-on information sf, or optionally, base addresses in the form of a direct or indirect component of the access addresses, are stored in a pointer or access address register 26 which, for example, can be a separate entity, a component of the processor core 24, or a component of the addressing unit 22. To the extent portions deposited in the access address register 26 or the add-on information sf in the access address register 26 are not to be processed, they can optionally also be routed directly out of the access address register 26 and past the addressing unit 22, or through this unit 22.

In a preferred embodiment, determination of the data type of the data to be stored is implemented by the addressing unit 22. An access address a0, a1-an, and the add-on information sf is generated in a manner dependent on the data type. In one variant, the given access address a0, a1-an, including the add-on information sf lies within a memory area of the RAM 12 which is supplied for the specific data type of the data to be stored at that instant.

For example, processing of mono audio data is possible. The access addresses a1-an on the address bus 18 address cells in a memory area of the RAM 12 using a mono sample size of, for example, 24 bits. The RAM 12 in this example, however, has 48 bits. The additional address a0 of the access address is not applied to the RAM 12 but is employed to write 24-bit data as ALU input data or ALU output data to the correct position in a high or low segment of the corresponding 48-bit word, or to extract the data therefrom. This corresponds to an appropriate assignment to least significant bits (LSBs) or most significant bits (MSBs) of the address word. The programmer or processor thus sees a 24-bit data memory arrangement RAM 12. A simple stereo processor that may not implement mono processing and also does not have the capability of adding the left channel to the right channel with corresponding audio data, or of shifting one channel into another as the intended ALU is formed from two ALUs 28, 30 without corresponding input and output multiplexers, that is, without the additional address value a0 and the add-on information sf as a component assigned separately to the access address. With input multiplexers without processing a0 or sf, a processor may shift the channels in rotated or transposed form into the ALUs 28, 30, and, for example, compute a mono signal by addition of the values and subsequent division by 2. However, this would still have to be stored as a stereo signal. By utilizing the additional address value a0 and the add-on information sf with an exclusive OR disjunction (XOR), the data type is also utilized correctly. Once again, a mono state is generated and an automatic conversion is implemented. A stereo state can be generated from mono data or a mono state while nevertheless storing a mono state without the adjacent signals being overwritten. To effect conversion, for example, a write mask of the data memory arrangement RAM 12 is also employed accordingly.

In yet another or alternative variant, an extended access address a0, a1-an, sf is used which has one or more additional bits a0, sf supplemental to the normal addressing information, which bits serve to describe the data type.

During subsequent accesses by an instruction code to the stored data, this enables the stored data to be retrieved and applied directly to a corresponding one of the ALUs 28, 30 based on the direct data-type logical link with the access address a0, a1-an, sf. The use of a special instruction code for data of different data types and analysis of the data type by the processor core 24 before assignment to an ALU 28, 30 can thus be dispensed with.

In the embodiment of FIG. 1, the stored data on the bus 14 from the RAM 12 are applied to a distribution and copying logic 32 which applies the data on the buses 34, 36 through the assignment units or multiplexers 38, 40 and on the buses 42, 44 to the first and second ALUs 28, 30. In addition, the data from the assignment units 38, 40 are applied on the buses 42, 44 to the processor core 24 which may include the access address register 26 with the access addresses. The assignment in the assignment units 38, 40 is carried out based on a data type bit assigned in each case for the data as data type information a0 of the access addresses a0, a1-an, sf which are applied to the assignment units 38, 40. In particular, when different data type information items a0 are found these can also be assigned by means of an exclusive OR disjunction (a0 XOR sf).

By means of additional assignment units 46, 48, and distribution and copying logic 50, the data, appropriately processed and outputted by the ALUs 28, 30 on the buses 52, 54 are in turn combined according to the data type information a0, a0 XOR sf assigned to this data, then applied on the bus 16 to the data memory arrangement RAM 12 for subsequent storage at the original memory addresses or at a new memory address.

The embodiment described involves a processor architecture 10 for processing audio data which are assigned to a left or right channel. This allows for separation into the LSB and the MSB of a given individual data word of the data which are retrieved from the RAM 12. The assignment to the two assignment units 38, 40 is achieved by the distribution and copying logic 32, where the MSB is applied to each of the assignment units 38, 40 at a first input, and the LSB is applied at a second input. Depending on the data type information item a0, and possibly, a stereo or mono information item in the form of an additional access address bit, or of an individual flag sf assigned to the access address a0, a1-an, the assignment to the two ALUs 28, 30 is then carried out. In the case of a mono signal to be generated from a stereo signal, addition of the given data can be converted by the assignment units.

In the audio area, differentiation of a mono signal, for example, from a microphone input; a stereo signal, for example music from sound carrier; and a multichannel signal, for example, from a 5.1 home theater audio, takes place accordingly in a signal processor optimized for audio signals and having the SIMD processor architecture 10 of the present invention. All of these signals, or individual data words and the data that form such signals, can typically be mixed and processed by this processor architecture 10. Processing is generally carried out in signal processors, where especially in the case of PCM (Pulse Code Modulation) baseband processing, the algorithm for all the channels or the data of different data types is often the same.

In the example illustrated in FIG. 1 having two ALUs 28, 30, four possibilities are provided, dependent on a mono or stereo capability as the data type information in connection with the retrieval of the data from the data memory arrangement RAM 12, these possibilities being illustrated by Table 2 in FIG. 2 with reference to the switching options. According to a first possibility, a mono value of an even address value for the access address can be loaded into both ALUs 28, 30. According to a second possibility, a mono value of an odd address value for the access address can be loaded into both ALUs 28, 30. According to a third possibility, a stereo value for the data is loaded into both ALUs 28, 30 where the address value of the access address is even. According to a fourth possibility, a stereo value of the data is loaded with a left/right transposition into both ALUs 28, 30 where the address value of the access address is odd. In this example, an assignment of the data type information a0, sf, is achieved during the assignment to access addresses a1-an such that when the data are stored attention is paid to differentiating between even access addresses and odd access addresses.

The type of access is encoded, for example, in a load instruction for the employed access address register 26 dependent on the data type mono or data type stereo. Encoding occurs before the actual routine for the assignment to the ALUs 28, 30 (which executes the algorithm) is implemented.

In general, this type of processor architecture 10, or a method of this type for the processing and assignment of data in this processor architecture 10, enables identical instruction code to be executed differently depending on the data type. The data type is defined as data type information by an information item stored in connection with the datum or the individual data to be stored, or in connection with the memory address or of the access address of the data in the data memory arrangement RAM 12.

The data type can be differentiated by the number of parallel-processed data sampling values. The data type can also be differentiated by the bit width of a data word. Access address a0, a1-an, sf for the data can be differentially assigned to the specific arithmetic units in the form of the ALUs 28, 30 dependent on the LSBs or the MSBs of the access address a0, a1-an, sf. The data can be written to the data memory arrangement RAM 12 in differing arrangements of the arithmetic units dependent on the LSBs or MSBs of the address.

In general, registers or other types of memories can be used in place of a data memory arrangement 12 in the category of a direct access memory. The marking of the data in the form of data type information item a0, sf which is logically linked to the access addresses a0, a1-an, sf, or is encoded in the form of access addresses therein, can also be implemented in the peripheral field of a register of the other memory arrangement.

FIG. 2 illustrates a table with various possible combinations for an assignment in the case of audio signal data for an assignment of the data to specific access addresses. As indicated in a first column, a differentiation is made as to whether a LSB of the access address a0-an is even or odd. As indicated in a second column, a differentiation is made as to whether a stereo flag sf is set in the access address a0-an to distinguish between mono and stereo signals. Dependent thereon, an assignment is effected by the assignment units 38, 40 in a manner analogous to a multiplex operation, of the data from the data memory arrangement RAM 12 to the first ALU 28 for a left audio channel or to the second ALU 30 for a right audio channel, or to both as indicated in columns 3 and 4.

The data which are processed and outputted from the ALUs 28, 30 are stored in the RAM 12 by the additional assignment units 46, 48 and stored in the additional combination unit 50. The additional combination unit 50 serves to combine data or addresses from the first assignment unit 46 which is connected following the ALUs 28, 30 and supplies the MSBs, and data or addresses from the second assignment unit 48 which is connected following the ALUs 28, 30 and supplies the LSBs. A corresponding storage in the data memory arrangement RAM 12 is carried out accordingly as indicated in Column 5 or 6 for the MSBs or the LSBs where in the event of certain optionsxa total suppression of storage is implemented.

Although the present invention has been illustrated and described with respect to several preferred embodiments thereof, various changes, omissions and additions to the form and detail thereof, may be made therein, without departing from the spirit and scope of the invention.

What is claimed is:

1. A processor, comprising:
   hardware memory that stores audio data;
   an addressing unit that supplies an access address to the hardware memory and a first state signal indicative of whether the audio data associated with the access address is stereo audio data or mono audio data, and a second state signal indicative of whether the audio data associated with the access address is L-bits or 2L-bits in length;
   a first selection device that receives the audio data associated with the access address and the second state signal and outputs either most significant bits or least significant bits of the audio data associated with the access address as a first selection device output signal in response to the second state signal;
   a second selection device that receives the audio data associated with the access address and the first and second state signals, and outputs either the most significant bits or the least significant bits of the audio data associated with the access address as a second selection device output signal in response to a first Boolean combination of the first and second state signals;
   a first arithmetic logic unit that receives and processes the first selection device output signal and provides a first ALU output signal;

a second arithmetic logic unit that receives and processes the second selection device output signal and provides a second ALU output signal; and means, responsive to the first and second ALU output signals and the first and second state signals, for selectively combining the first and second ALU output signals to provide write data to the hardware memory.

2. The processor of claim 1, where the means for selectively combining comprises a selector that is responsive to the second state signal and provides the first ALU output signal as either the least significant bits or the most significant bits of the write data in response to the second state signal.

3. The processor of claim 2, where the Boolean combination of the first and second state signals is an XOR Boolean combination of the first and second state signals.

4. The processor of claim 1, where the means for selectively combining the first and second output signals comprises:

a third selector device that receives the first and second ALU output signals and provides a selected one of the first and second ALU output signals as most significant bits of the write data; and a fourth selector device that receives the first and second ALU output signals and provides a selected one of the first and second ALU output signals as least significant bits of the write data.

5. The processor of claim 4, where the third selector device is responsive to the second state signal, and the fourth selector device is responsive to a second Boolean combination of the first and second state signals.

6. A processor, comprising:

hardware memory that stores audio data;

means for supplying an access address to the hardware memory, for supplying a first state signal indicative of whether the audio data associated with the access address is stereo audio data or mono audio data, and for supplying a second state signal indicative of whether the audio data associated with the access address is L-bits or 2L-bits in length;

means, responsive to the stored audio data associated with the access address from the hardware memory and the second state signal, for selectively outputting either most significant bits or least significant bits of the audio data associated with the access address as a first selection device output signal in response to the second state signal;

a second selection device that receives the audio data associated with the access address from the hardware memory and receives the first and second state signals, and outputs either the most significant bits or the least significant bits of the audio data associated with the access address as a second selection device output signal in response to a first Boolean combination of the first and second state signals;

a first arithmetic logic unit that receives and processes the first selection device output signal and provides a first ALU output signal;

a second arithmetic logic unit that receives and processes the second selection device output signal and provides a second ALU output signal; and selection logic that is responsive to the first and second ALU output signals and the first and second state signals, and selectively combines the first and second ALU output signals to provide write data to the hardware memory.

7. The processor of claim 6, where the selection logic comprises a selector that is responsive to the second state signal and provides the first ALU output signal as either the least significant bits or the most significant bits of the write data in response to the second state signal.

8. The processor of claim 7, where the Boolean combination of the first and second state signals is an XOR Boolean combination of the first and second state signals.

9. The processor of claim 6, where the selection logic that selectively combined the first and second output signals comprises:

a third selector device that receives the first and second ALU output signals and provides a selected one of the first and second ALU output signals as most significant bits of the write data; and a fourth selector device that receives the first and second ALU output signals and provides a selected one of the first and second ALU output signals as least significant bits of the write data.

10. The processor of claim 9, where the third selector device is responsive to the second state signal, and the fourth selector device is responsive to a second Boolean combination of the first and second state signals.

11. A processor, comprising:

hardware memory that stores data;

means for supplying an access address to the hardware memory, for supplying a first state signal indicative of whether the data associated with the access address is a first data type or a second data type, and for supplying a second state signal indicative of whether the data associated with the access address is L-bits or 2L-bits in length;

means, responsive to the stored data associated with the access address from the hardware memory and the second state signal, for selectively outputting either most significant bits or least significant bits of the stored data associated with the access address as a first selection device output signal in response to the second state signal;

a second selection device that receives the stored data associated with the access address from the hardware memory and receives the first and second state signals, and outputs either the most significant bits or the least significant bits of the stored data associated with the access address as a second selection device output signal in response to a first Boolean combination of the first and second state signals;

a first arithmetic logic unit that receives and processes the first selection device output signal and provides a first ALU output signal;

a second arithmetic logic unit that receives and processes the second selection device output signal and provides a second ALU output signal; and selection logic that is responsive to the first and second ALU output signals and the first and second state signals, and selectively combines the first and second ALU output signals to provide write data to the hardware memory.

12. The processor of claim 11, where the selection logic comprises a selector that is responsive to the second state signal and provides the first ALU output signal as either the least significant bits or the most significant bits of the write data in response to the second state signal.

13. The processor of claim 12, where the Boolean combination of the first and second state signals is an XOR Boolean combination of the first and second state signals.

14. The processor of claim 11, where the selection logic that selectively combines the first and second output signals comprises:
a third selector device that receives the first and second ALU output signals and provides a selected one of the first and second ALU output signals as most significant bits of the write data; and
a fourth selector device that receives the first and second ALU output signals and provides a selected one of the first and second ALU output signals as least significant bits of the write data.

15. The processor of claim 14, where the third selector device is responsive to the second state signal, and the fourth selector device is responsive to a second Boolean combination of the first and second state signals.

* * * * *